United States Patent
Hars

(10) Patent No.: US 9,602,281 B2
(45) Date of Patent: *Mar. 21, 2017

(54) PARALLELIZABLE CIPHER CONSTRUCTION

(71) Applicant: THE BOEING COMPANY, Huntington Beach, CA (US)

(72) Inventor: Laszlo Hars, Lafayette, CO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/975,316

(22) Filed: Dec. 18, 2015

(65) Prior Publication Data

US 2016/0112196 A1 Apr. 21, 2016

Related U.S. Application Data

(63) Continuation of application No. 14/497,933, filed on Sep. 26, 2014, now Pat. No. 9,252,943.

(51) Int. Cl.
| | | |
|---|---|---|
| G06F 12/14 | (2006.01) |
| H04L 9/30 | (2006.01) |
| H04L 9/06 | (2006.01) |
| G06F 21/60 | (2013.01) |
| H04L 9/32 | (2006.01) |

(52) U.S. Cl.
CPC ........ *H04L 9/3066* (2013.01); *G06F 12/1408* (2013.01); *G06F 21/602* (2013.01); *H04L 9/0618* (2013.01); *H04L 9/0625* (2013.01); *H04L 9/3242* (2013.01); *G06F 2212/402* (2013.01); *G06F 2221/2107* (2013.01); *H04L 2209/24* (2013.01)

(58) Field of Classification Search
CPC ........................... G06F 12/1408; H04L 9/3066
See application file for complete search history.

(56) References Cited

U.S. PATENT DOCUMENTS

| | | |
|---|---|---|
| 7,093,137 B1 | 8/2006 | Sato et al. |
| 7,469,344 B2 | 12/2008 | Folmsbee |
| | (Continued) | |

OTHER PUBLICATIONS

Al-Hazaimeh, "Design of a New Block Cipher Algorithm," IISTE, Network and Complex Systems, vol. 3, No. 8, 2013, 7 pages.
(Continued)

*Primary Examiner* — William Powers
(74) *Attorney, Agent, or Firm* — Womble Carlyle Sandridge & Rice LLP

(57) ABSTRACT

A method of providing security in a computer system includes producing an output block of data from an input block of data, which may be performed by one or more logic circuits. The output block of data may be produced by a cipher that includes a plurality of parallel, different mixing functions and a combination function. In this regard, producing the output block of data includes applying the plurality of parallel, different mixing functions to the input block of data to produce a plurality of updated blocks of data, with each mixing function mapping the input block of data to a respective one of the plurality of updated blocks of data. And producing the output block of data includes combining the plurality of updated blocks of data in the combination function to produce the output block of data.

22 Claims, 7 Drawing Sheets

(56) References Cited

U.S. PATENT DOCUMENTS

| | | | |
|---|---|---|---|
| 7,802,108 B1 | 9/2010 | Master et al. | |
| 7,809,135 B2* | 10/2010 | Johnson | G06F 21/14 380/44 |
| 7,894,599 B2 | 2/2011 | Rigler | |
| 7,937,595 B1 | 5/2011 | Kumar et al. | |
| 8,121,286 B2* | 2/2012 | Halevi | H04L 9/002 380/28 |
| 8,370,645 B2 | 2/2013 | Asnaashari | |
| 8,504,849 B2 | 8/2013 | Jogand-Coulomb et al. | |
| 2003/0198345 A1* | 10/2003 | Van Buer | H04L 9/0631 380/43 |
| 2009/0080647 A1* | 3/2009 | Mantin | H04L 9/0637 380/29 |
| 2009/0202070 A1* | 8/2009 | Mantin | H04L 9/0618 380/44 |
| 2013/0067212 A1* | 3/2013 | Farrugia | H04L 9/0631 713/150 |
| 2013/0117577 A1 | 5/2013 | Hars et al. | |

OTHER PUBLICATIONS

Beaulieu et al., "The Simon and Speck Families of Lightweight Block Ciphers," NSA, Jun. 2013, 45 pages.

Bogdanov et al., "PRESENT: An Ultra-Lightweight Block Cipher," Cryptographic Hardware and Embedded Systems—CHES 2007, Lecture Notes in Computer Science, vol. 4727, 2007, pp. 450-466.

Hars et al., "Pseudorandom recursions II," EURASIP Journal on Embedded Systems, 2012, 11 pages.

Knudsen et al., "PRINTcipher: A Block Cipher for IC-Printing," Cryptographic Hardware and Embedded Systems, CHES 2010, Lecture Notes in Computer Science, vol. 6225, Aug. 2010, 15 pages.

"Feistel cipher," 2014, Wikipedia article—http://en.wikipedia.org/w/index.php?title=Feistel_cipher&oldid=591294982 [May 27, 2014], 6 pages.

"Linear feedback shift register," 2014, Wikipedia article—http://en.wikipedia.org/w/index.php?title=Linear_feedback_shift_register&oldid=609519852 [May 27, 2014], 10 pages.

"Power analysis," 2014, Wikipedia article—http://en.wikipedia.org/w/index.php?title=Power_analysis&oldid=609430707 [May 27, 2014] 4 pages.

* cited by examiner

PARALLELIZABLE CIPHER CONSTRUCTION

CROSS-REFERENCE TO RELATED APPLICATION(S)

The present application is a continuation of U.S. patent application Ser. No. 14/497,933, entitled: Parallelizable Cipher Construction, filed on Sep. 26, 2014. The present application is also related to U.S. patent application Ser. No. 13/722,871, entitled: Secure Memory Transaction Unit, filed on Dec. 20, 2012, which is a continuation-in-part of and claims priority to U.S. patent application Ser. No. 13/341,630, entitled: Infinite Key Memory Transaction Unit, filed on Dec. 30, 2011, which in turn claims priority to U.S. Provisional Patent Application No. 61/505,039, entitled: Secure Server for Configuring and Programming Secure Microprocessors and Infinite Key Memory Transaction Unit, filed on Jul. 6, 2011. The present application is further related to U.S. patent application Ser. No. 14/472,978, entitled: Double-Mix Feistel Network for Key Generation or Encryption, U.S. patent application Ser. No. 14/473,006, entitled: Address-Dependent Key Generator by XOR Tree, and U.S. patent application Ser. No. 14/473,042, entitled: Address-Dependent Key Generation with A Substitution-Permutation Network, all of which filed on Aug. 29, 2014. The contents of all of the aforementioned are incorporated herein by reference in their entireties.

TECHNOLOGICAL FIELD

The present disclosure relates generally to the protection of data in a computer system and, in particular, to the protection of data stored in memory in a computer system, which data is often transferred on one or more buses therein.

BACKGROUND

To provide for secure communications and protection of financial, military, medical or other data requiring a high degree of protection, computer and microprocessor-based systems now implement various security measures. These measures are generally intended to preclude an adversary's illicit access to data stored in a memory being accessed by the microprocessor, for example, because the memory and microprocessor are on the same circuit board and/or coupled by a bus.

Common types of attacks on such processors can be categorized as active or passive attacks. In passive attacks an adversary reads the contents of the memory, in the hope to discover secrets, like passwords, copyrighted material, etc. A passive attacker can also monitor the data traffic between the processor and the memory (or some peripherals) for secrets.

Active attacks attempt to modify the contents of the memory, or the data traffic between the memory and the processor. Active attacks include attempts to copy-and-paste memory blocks between different locations, or playing back earlier content of the same, or another location. Such attacks can cause harm, for example by creating an infinite loop, or otherwise impact the program. In a known data recognition attack, an adversary may attempt to learn an encryption key by watching writes of known data to the same address.

It may therefore be desirable to have a system and method that addresses these challenges, and improves upon existing practices.

BRIEF SUMMARY

Secure computer systems generally need ciphers that encrypt or decrypt data very fast, causing negligible slow-down compared to unencrypted solutions. Currently used ciphers take several clock cycles to encrypt data blocks. Example implementations of the present disclosure therefore provide a parallelizable cipher construction in which a number of mixing functions may be implemented in parallel to thereby decrease the time required to encrypt or decrypt data. The cipher of example implementations may therefore encrypt or decrypt blocks of data of various sizes, requiring no more than a single clock cycle in many if not most electronic implementations.

In some example implementations, the parallelizable cipher construction may be implemented with a technique that has been developed to address malicious attempts to copy-and-paste memory blocks between different locations. This technique involves memory address-dependent encryption and address-dependent data authentication, either or both of which may involve use of the parallelizable cipher construction of example implementations. The address-dependent encryption/data authentication can be implemented by a "tweakable" cipher, where part of the key (the tweak value) may depend on the memory location and perhaps other information (e.g., data version value, configuration data). This may provide a desired diversification of the data encryption and authentication.

According to one aspect of example implementations, a method of providing security in a computer system is provided. The method includes receiving an n-bit input block of data, and producing an m-bit output block of data from the n-bit input block of data, the production of which may be performed by one or more logic circuits in at most one clock cycle thereof. The m-bit output block of data may be produced by a cipher that is non-invertible, and includes a plurality of parallel, different mixing functions and a combination function. In some examples, m in the m-bit output block of data may be the same or different in number than n in the n-bit input block of data.

In accordance with example implementations, producing the m-bit output block of data includes applying the plurality of parallel, different mixing functions to the n-bit input block of data to produce a plurality of n-bit updated blocks of data, with each mixing function mapping the n-bit input block of data to a respective one of the plurality of n-bit updated blocks of data. And producing the m-bit output block of data includes combining the plurality of n-bit updated blocks of data in the combination function to produce the m-bit output block of data.

In some examples, the plurality of parallel, different mixing functions may be invertible. The mixing functions may be composed of any one or more of a number of different types of mixing functions. For example, at least some of the mixing functions may be implemented by respective Feistel networks including respective, different round functions. Additionally or alternatively, for example, at least some of the mixing functions may be implemented by respective double-mix Feistel networks including respective, different first or second round functions. Further additionally or alternatively, for example, at least some of the mixing functions may be implemented by respective substitution-permutation networks including respective, different substitution layers or transformation layers. Further additionally or alternatively, for example, at least some of the mixing functions may be implemented by respective binary trees of exclusive-or (XOR) operations, in which a plurality of sub-keys may be produced from the input block of data and mixed using the respective binary trees.

In some examples, in the combination function, each bit of the m-bit output block of data may depend from one or more bits of the n-bit input block of data, and every bit of the n-bit block of data may influence one or more bits of the m-bit output block of data. In a more particular example, the combination function may be implemented by a bitwise exclusive-or (XOR) operation or another appropriate, perhaps more complex operation.

In some examples, the m-bit output block of data may be a data authentication tag, and producing the m-bit output block of data may include producing the data authentication tag that depends on a respective address of a memory location in a memory. In these examples, the method may further include performing a write operation to write a block of ciphertext and the data authentication tag at the memory location having the respective address. The memory, then, may include a window of memory locations each of which stores a respective data authentication tag that changes from memory location to memory location.

In some examples, the m-bit output block of data may be a multi-bit pad value, and producing the m-bit output block of data may include producing the multi-bit pad value based on a respective address of a memory location in a memory. In these examples, the method may further include combining the pad value with a block of plaintext by an XOR operation to produce a block of ciphertext, and performing a write operation to write the block of ciphertext at the memory location having the respective address. Similar to the prior example, the memory here may include a window of memory locations each of which stores a respective block of ciphertext that changes from memory location to memory location.

In other aspects of example implementations, a system is included for providing security in a computer system. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
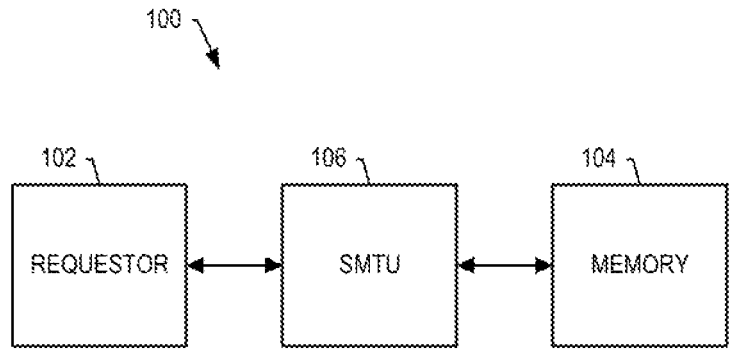
FIG. 1 is an illustration of a system in accordance with example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Furthermore, it should be understood that unless otherwise specified, the terms "data," "content," "information," and similar terms may be at times used interchangeably. Like reference numerals refer to like elements throughout.

Referring now to FIG. 1, a system 100 is illustrated according to example implementations of the present disclosure. The system may include one or more of each of a number of components, units or the like (generally "components") at least some of which may be composed of logic circuits such as multiplexers, registers, arithmetic logic units, memory, microprocessors and the like. The system may be designed for any of a number of different applications, and may have particular applicability in systems including or coupled to memory susceptible to attacks, such as in-flight computers, military and space programs, corporate network, personal and laptop computers, smart mobile devices. As shown, for example, the system may include one or more components referred to herein as requestors 102 configured to initiate or otherwise request read and/or write transactions (at times referred to as operations) with one or more memories 104, which in some examples may occur on one or more buses between them.

In accordance with example implementations, the system 100 may further include one or more components referred to herein as secure memory transaction units (SMTUs) 106 configured to encrypt and decrypt data transfers between a requestor 102 and memory 104, and may be used in at least some if not all read or write transactions with the memory. And as described below, in some but perhaps not all examples, the SMTUs may also be configured to authenticate the contents of the memory. In various examples, the SMTU design may be memory agnostic in that the type and location of the memory (internal or external) may be "unknown" to the SMTU.

In some examples, the SMTU 106 may provide, with very high probability, a different encryption for every location in the memory 104. The SMTU may use a parallelizable cipher construction for encryption and/or authentication of the contents of the memory. In some examples in which the SMTU uses the parallelizable cipher construction for one but not the other of the encryption and authentication, the SMTU may use any of a number of other ciphers for the other, such as a combination of standard operation modes of the Advanced Encryption Standard (AES) cipher. Each amount (e.g., 16 bytes) of plaintext data (sometimes simply referred to as plaintext or data) to be stored at a respective memory location at least within a window of memory locations may be encrypted with a unique encryption and tagged with a data version value and data authentication tag, which may be stored at the memory location with the encrypted data (at times referred to as ciphertext).

In some examples, the data version value may be derived from a global write counter (GWC) (e.g., 48-bit value) that indicates the number of encrypted write operations that have taken place such as in a current computing session. In other examples, the data version value may be derived using the number of write operations over multiple computing sessions, a time stamp or the like. Or in yet other examples, the data version value may be derived from a clock.

In some examples, the GWC may be reset at the beginning of every session of secure operation. The GWC values may be stored in-the-clear or encrypted with the user data, and modified by a secret mask value before use as part of the key generation or diversifying the encryption or data authentication in other ways. The GWC value may be incremented before any write operation by an increment value, which may be sized similar to the GWC (e.g. 48-bit value). This increment value may be a large odd value that does not have many consecutive 1's or 0's in its binary representation. Examples of suitable increment values are segments of the bit sequences of $\pi$, e, $\sqrt{2}$, $\sqrt{3}$, the golden ratio, etc. Use of values such as these may assure that consecutive GWC values differ in about half the bits, in the average. Use of an odd GWC increment value may assure that the GWC will not wrap around in typical applications for more than ten years of continuous operation.

The data authentication tag at a memory location may depend on the ciphertext at that memory location, and in a manner that is cryptographically secure in that an adversary cannot create a valid data authentication tag, nor may the adversary be able to deduce any information about the ciphertext from the data authentication tag. In some examples, the data authentication tag may serve as a message authentication code, a short piece of information used to authenticate the ciphertext, and to detect data tampering and forgery. The tag may protect both the ciphertext's integrity as well as its authenticity, by allowing detection of any changes to it. In some examples, the tag may be implemented by a block cipher, that is, an algorithm that operates on the ciphertext to perform a transformation specified by a key.

The ciphertext and data authentication tag at a memory location may be produced with keys based on at least the data version value and address of the memory location. The data version value may be updated with each write operation at a memory location, and the key with which the ciphertext is produced may thereby change with each write operation, as well as from memory location to memory location. The data authentication tag may be produced with a second key different from the key that produced the block of ciphertext; but like that key, the second key may change with each write operation and from memory location to memory location. In some examples, a secret random number and other values, such as a security mode value, may be incorporated to further diversify the encryption and authentication. As described herein, the term random may be used broadly to refer to either random or pseudorandom (e.g., number iteratively generated by a deterministic algorithm, starting from a true random seed).

During read transactions in which the requestor 102 has requested data from the memory, the SMTU may read previously-encrypted data (ciphertext) from the memory. The encrypted data may be decrypted and authenticated by the SMTU against signs of tampering; and the SMTU may return the decrypted data (plaintext) to the requestor in instances in which the data is considered valid. In write transactions, the SMTU may read the data at a target location, then decrypt and authenticate that data just as with a read access. Once this is complete, the SMTU may cause the data to be written to be merged with the data read from the location, encrypted, and then written back to the memory. As used here, merged means to replace the portion of the data read back that has changed. If desired, a different approach can be used when a complete block of ciphertext is to be written. In these instances, the merge operation may become a replacement, and the initial read operation may be omitted, trading security for speed.

In various examples, a method for providing security for read data being transferred between, or within, units in the system 100 may include dividing the memory 104 into a series of addressable locations (the memory thereby being an addressable memory), each having an address and each storing encrypted data, a data version value (sometimes referred to as version information, or simply as a version value) and a data authentication tag. As described herein, an addressable location of the memory may at times be varyingly but equally referred to as an address, a location or an addressable location. A unique encryption key for the encrypted data, and a different, unique authentication key for the data authentication tag, may be used for each address. These keys may be unpredictable to an adversary, and kept secret before, during and after they are used.

In each read operation, the data version value, data authentication tag and a block of ciphertext may be read at a memory location having a respective address. The respective keys with which the ciphertext and data authentication tag were produced may be regenerated using the data version value and respective address. The ciphertext may be decrypted with its key to produce its corresponding plaintext. And using the second key for the data authentication tag, the ciphertext may be compared with the data authentication tag to verify its integrity and authenticity.

In each write operation, new plaintext data may be written to a memory location in memory 104. In some examples, each write operation may be preceded by a data read at the location and verification of the data by the SMTU 106 as valid. The process of writing data to the memory location may include the SMTU updating the data version value such as to reflect a new number of memory write operations made. The SMTU may then use another encryption of the new data using the updated data version value and respective address of the memory location (and perhaps a random number and/or some other values), and the SMTU may generate a new data authentication tag that depends on the encrypted new data.

In a further aspect of example implementations of the present disclosure, the SMTU 106 may be configured to implement a parallelizable cipher construction. This cipher may be non-invertible block cipher and include a plurality of parallel, different mixing functions and a combination function. As explained in greater detail below, these mixing functions may include the same or different combinations of different types of functions, such as Feistel networks, double-mix Feistel networks (DMFNs), substitution-permutation networks, binary trees of bitwise exclusive-or (XOR) operations—trees at times referred to simply as XOR trees, some standard cipher operated a reduced number of rounds, and the like. The cipher of example implementations may be used for encryption or authentication, and may be implemented in one or more logic circuits in at most one clock cycle of the respective circuit(s). As a non-invertible cipher, no decryption may be possible in certain encryption modes such as electronic codebook (ECB) or cipher-block chaining (CBC), although stream cipher modes are possible.

According to this further aspect of example implementations, the SMTU 106 may be configured to receive an n-bit input block of data, and produce by the cipher, an m-bit output block of data from the input block of data. The block size n may be arbitrary, and in various examples n may be 64, 128 or 256 bits; and m and n may be equal or unequal in number. Production of the output block of data may include the SMTU being configured to apply the plurality of parallel, different mixing functions to the input block of data to produce a plurality of updated blocks of data, with each mixing function being configured to map the input block of data to a respective one of the plurality of updated blocks of data. The SMTU may then combine the plurality of updated blocks of data in the combination function to produce the output block of data.

In some examples, the mixing functions may be invertible. As indicated above, the mixing functions may be different, and may be of any one or more if a number of different types of mixing functions. For example, at least some of the mixing functions may be implemented by respective Feistel networks including respective, different round functions. Additionally or alternatively, for example, at least some of the mixing functions may be implemented by respective DMFNs including respective, different first or second round functions. Additionally or alternatively, for example, at least some of the mixing functions may be implemented by respective substitution-permutation networks including respective, different substitution layers or transformation layers. Further additionally or alternatively, for example, at least some of the mixing functions may be implemented by respective XOR trees, in which a plurality of sub-keys may be produced from the input block of data and mixed using the respective binary trees.

In some examples, in the combination function, each bit of the output block of data may depend from one or more bits of the input block of data, and every bit of the block of data may influence one or more bits of the output block of data. In a more particular example, the combination function may be implemented by a bitwise XOR operation or another appropriate, perhaps more complex operation.

In some examples, m in the m-bit output block of data may be the same in number as n in the n-bit input block of data. In other examples, m may be different than n. For example, the updated blocks of data may be partitioned into pieces, which may then be combined to produce the output block of data. In a more particular example, lengths of the updated blocks of data may be increased by repeating certain bits one or more of which may be inverted, and dispersing these repeated bits among the respective updated blocks of data, perhaps differently for each mixing function. The combiner may then operate on these extended-length updated blocks of data.

In some examples in which the cipher is used for authentication, the output block of data may be a data authentication tag, and SMTU 106 may be configured to produce the data authentication tag that depends on a respective address of a memory location in the memory 104. In one example in which n=208 and m=80, the input block of data to the cipher may be a 128-bit ciphertext concatenated with a 32-bit address and 48-bit data version value, and the data authentication tag may be formed from the resulting 80 bits. The SMTU may then be further configured to perform a write operation to write a block of ciphertext and the data authentication tag at the memory location having the respective address. In these examples, the memory may include a window of memory locations each of which stores a respective data authentication tag that changes from memory location to memory location.

In some examples in which the cipher is used for encryption, the output block of data may be a multi-bit pad value, and the SMTU 106 may be configured to produce the pad value based on a respective address of a memory location in the memory 104. In one example in which n=m=128, the pad may be computed from an input block of data composed of a 32-bit address, concatenated with 48-bit data version value and configuration data. The SMTU may then combine the pad value with a block of plaintext by an XOR operation to produce a block of ciphertext. Similar to the previous example, the SMTU may be further configured to perform a write operation to write the block of ciphertext at the memory location having the respective address. And the memory may include a window of memory locations each of which stores a respective block of ciphertext that changes from memory location to memory location.

Figure 2:
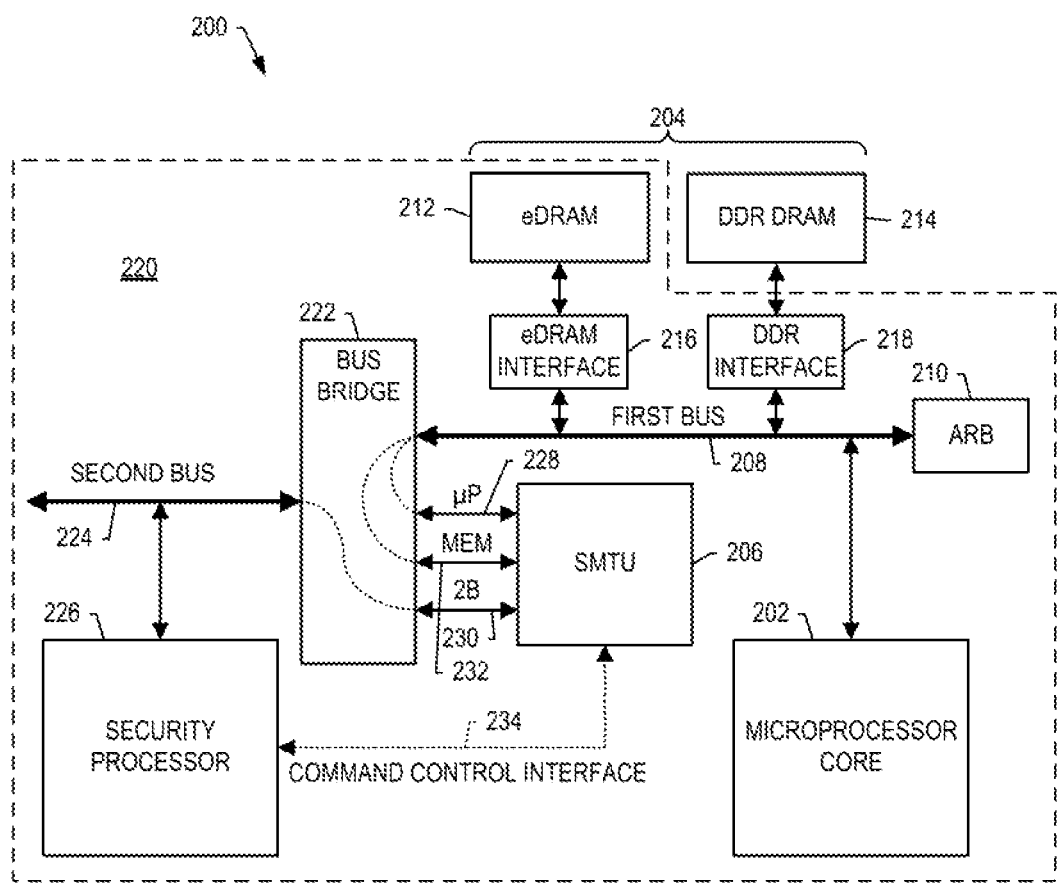
FIG. 2 is an illustration of a system that in some examples may correspond to the system of FIG. 1.

FIG. 2 illustrates one example of a system 200 that in some examples may correspond to the system 100 of FIG. 1. The system may be constructed in accordance with any of a number of different approaches. In some examples, the system may be constructed according to a system-on-chip (SoC) approach in which the components of a system are integrated into a single integrated circuit (IC) (sometimes referred to as a "chip"). In a more particular example, the system may be constructed according to the CoreConnect microprocessor bus-architecture from IBM Corporation. As described herein, various components of the system or functions of components of the system may be described in the nomenclature of a particular technology such as SoC or even CoreConnect. It should be understood that any specific nomenclature used herein is merely for purposes of illustration, and should not be taken to limit the scope of example implementations of the present disclosure.

Similar to the system 100 of FIG. 1, the system 200 of FIG. 2 may include a number of components at least some of which may be composed of logic circuits. As shown, for example, the system may include a microprocessor core 202, memory 204 and SMTU 206, which in some examples may function as or correspond to the requestor 102, memory 104 and SMTU 106 of FIG. 1. Although not shown, it should be understood that the system may include other components that may at times be configured to function as a requestor, which again may be a component configured to initiate or otherwise request read and/or write transactions with memory.

As shown in FIG. 2, the microprocessor core 202 may be directly or indirectly coupled to a first bus 208 along with the memory 204, SMTU 206 and other components, and use of the first bus may be allocated by an arbitration circuit 210. In one example, the microprocessor core may be a PowerPC core commercially available from IBM Corporation, and the first bus may be a processor local bus (PLB). Examples of suitable memory include embedded dynamic access memory (eDRAM) 212, double data rate synchronous (or other) dynamic random access memory (DDR DRAM) 214 or the like, some of which may be coupled to the first bus by respective memory controls or interfaces 216, 218. In some examples in which the system is constructed as a SoC with various components integrated into a single integrated circuit 220, the memory may be off-chip (external) from other components of the system, and may be coupled to the first bus by an on-chip (internal) memory control. This is illustrated, for example, by the DDR DRAM in FIG. 2.

The components coupled to the first bus 208 may also include a bus bridge 222 between the first bus and another, second bus 224 such as a transaction bus to which additional components may be coupled, such as a security processor 226 and perhaps components that may at times function as requestors. In some examples, the first bus may be a high-speed bus with high-performance components coupled thereto, and the second bus may be a low-speed bus. In these examples, the bus bridge may serve to separate the high-performance components from the low-performance components, which may in turn improve system performance.

The SMTU 206 may be configured to encrypt and decrypt data transfers between requestors such as the microprocessor core 202 and either or both of the eDRAM 212 or DDR DRAM 214. The SMTU may act as a slave unit serving read and write requests initiated by the microprocessor core or another requestor, where the SMTU may initiate the read or write as requested from a particular memory address. The SMTU may thereby provide a high level of security for these transactions.

The SMTU 206 may be coupled in the system 200 in any of a number of different manners. As shown, for example, the SMTU may be coupled to the bus bridge 220 by three bidirectional external data interfaces, and may be coupled to the security processor 226 by another bidirectional external data interface. That is, the SMTU may be coupled to the bus bridge by a microprocessor-core interface 228, a second-bus interface 230 and a memory interface 232, and coupled to the security processor by a command-and-control interface 234.

The microprocessor-core interface 228 may be coupled to the microprocessor core 202 via the first bus 208 to receive control information such as requests to read data from and/or write data to memory 204. The second-bus interface 230 may be coupled to the second bus 224, and the memory interface 232 may be coupled to the memory via the first bus. The bus bridge 220 may allow transactions over the microprocessor-core interface and memory interface be routed only to and from the first bus, and the transactions over the second-bus interface to be routed only to and from the second bus. The command-and-control interface 234, then, may enable the security processor 226 to provide command and control information to the SMTU through a separate interface.

Figure 3:
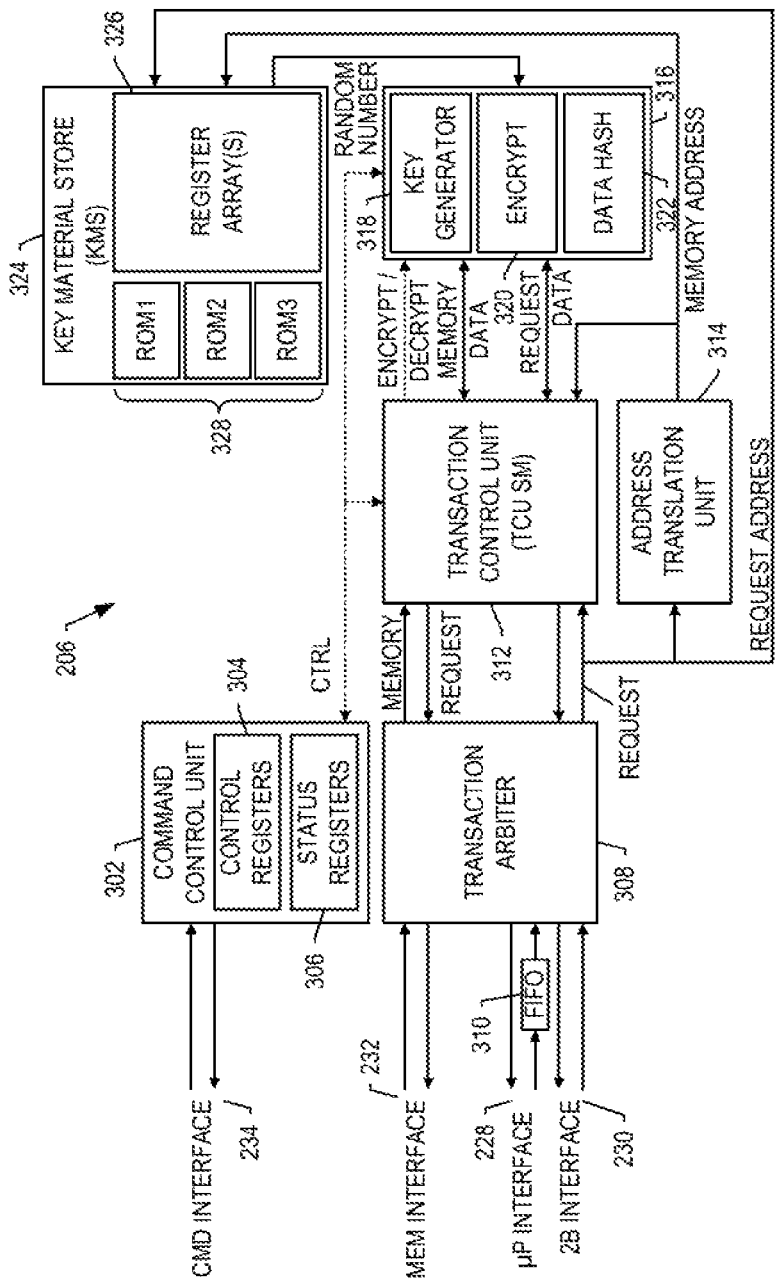
FIG. 3 is an illustration of a secure memory transaction unit, in accordance with example implementations.

FIG. 3 is a diagram illustrating various components of the SMTU 206 of FIG. 2, at least some of which, again, may be composed of logic circuits. As shown, the SMTU may include, and the command-and-control interface 234 may be coupled to, a command control unit 302 having control registers 304 and status registers 306. The SMTU may include a transaction arbiter 308 coupled to and configured to allocate use of the microprocessor-core interface 228, second-bus interface 230 and memory interface 232. A first-in first-out (FIFO) memory 310 on the microprocessor-core interface may be configured to buffer transactions to the arbiter.

The arbiter 308 may also be coupled to a transaction control unit 312 and an address translation unit 314, and the transaction control unit may be in turn coupled to a cryptography unit 316 that provides a key generator 318, encryption unit 320 and data-hashing unit 322. The cryptography unit may be coupled to a key material store (KMS) 324 configured to provide random numbers to the key generator to generate keys for the encryption unit and data-hashing unit. The encryption unit may be configured to encrypt and decrypt data for all read and write operations with an appropriate memory 204 in response to read or write requests invoking the SMTU 206. And the data-hashing unit may be configured to produce data authentication tags for encrypted data (ciphertext) read from and written to the memory. In some examples, either or both of the encryption unit or data-hashing unit may employ a parallelizable cipher construction such as that described herein. And in some examples in which only one but not the other uses the parallelizable cipher construction, the other may use any of a number of other constructs. For example, the encryption unit may be configured to employ an AES cipher for encryption and decryption operations, or the data-hashing unit may be configured to employ a keyed hash function.

In some examples, the KMS 324 may include one or more register arrays 326 (sometimes referred to as KMS memories) configured to provide random numbers. Because the SMTU relies on random numbers provided by the KMS, the use of high quality random numbers is often desirable. In some examples, then, the KMS may include four 64×64 register arrays that provide 16K-bit random numbers. Prior to operation, the KMS unit may be initialized with 16K-bit random numbers, which in some examples may be generated outside of the SMTU.

As an alternative to using a true random number, in some examples, the KMS 324 may be initialized from one or more onboard configuration/entropy read-only memory blocks (ROMs) 328 such as 512×16 ROMs, three of which are shown as ROM1, ROM2 and ROM3. These ROMs may contain random numbers generated during system design. Using the configuration ROMs as the source of the random numbers may make the generated keys less random, therefore degrading the strength of the anti-tampering mechanism. However, there are applications in which using the ROMs as the random number sources may be desirable. One application is of a time critical application, in which long initialization delays that are associated with generation of the random number are not acceptable. Another type is an application that needs to generate an encrypted data image that can be restored following a system reset or an image that can be restored on a different system.

Further information regarding various features of the system 200 and SMTU 206 according to example implementations may be found below and in the aforementioned, related and incorporated '871 application.

Figure 4:
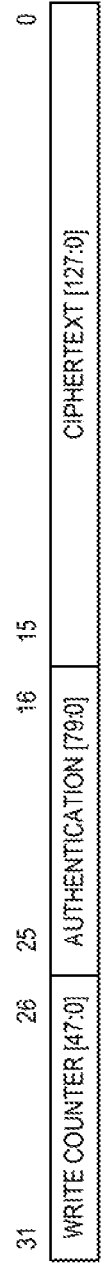
FIG. 4 illustrates the data structure of information stored in a memory location, in accordance with example implementations.

FIG. 4 illustrates the data structure for encrypted data stored in memory 104, 204, according to some example implementations of the present disclosure. As shown, encrypted data may be stored using 32-byte blocks each of which may include 16 bytes of encrypted payload (ciphertext), and 16 bytes of security data. The security data may include 6 bytes of a data version value (in the illustrated example, a write counter value), and 10 bytes of authentication tag. The 6-byte write counter is a field that may be incremented every time a memory location is written, regardless of the address. As a result, the incremented value is unique to each address. The encryption operation and the authentication key for a memory location may be derived from its address, and write counter value, and from a random number. In other examples, more or fewer fields may be used in the encryption. Because every 16 bytes of encrypted data require an additional 16 bytes for an authentication tag and write counter value, the effective data storage capacity of each window of memory locations may be one-half its physical size. But again, in other examples, larger or smaller memories and different data and tag sizes may be implemented.

Figure 5:
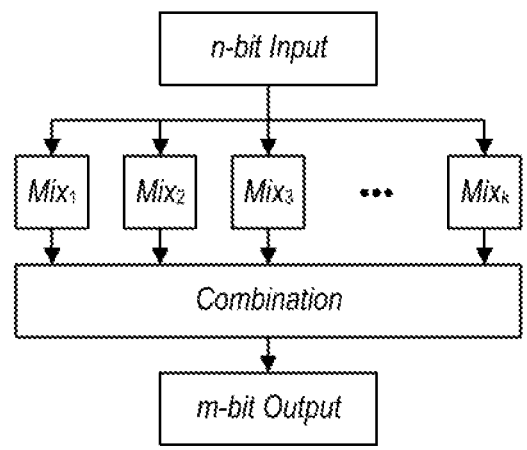
FIG. 5 illustrates a parallelizable cipher construction, in accordance with various example implementations.

FIG. 5 illustrates a parallelizable cipher construction in accordance with example implementations of the present disclosure. As shown, the cipher includes k mixing functions that may be applied to an n-bit input block of data to produce n-bit updated blocks of data, and a combination function in which the n-bit updated blocks of data may be combined to produce an m-bit output block of data. The mixing functions and combination function may have a number of different characteristics or properties such as those described above.

More particularly as to the mixing functions, they may be similar to but much faster than ciphers, but may also be less secure. As suggested above, each mixing function may be invertible, and may map the n-bit input block of data to an n-bit updated block of data. In some examples, this mapping or mixing may depend on a large amount of secret key material (e.g., from KMS 324). In the mixing function, every bit of the input block of data may nonlinearly influence every bit of the updated block of data. And every nonempty set of bits of the input block of data may influence every bit of the updated block of data (no effect cancels). Examples of suitable mixing functions include Feistel networks, DMFNs, substitution-permutation networks, XOR trees, standard ciphers operated a reduced number of rounds, and the like.

The Feistel network (sometimes referred to as the Feistel cipher) and DMFN may be used as mixing functions. The Feistel network may be performed in iterations (or rounds) with an internal function called the round function, and round keys for respective rounds. The DMFN may be performed with two round functions, at times referred to as first and second round functions, as well as round keys for respective rounds.

Figure 6:
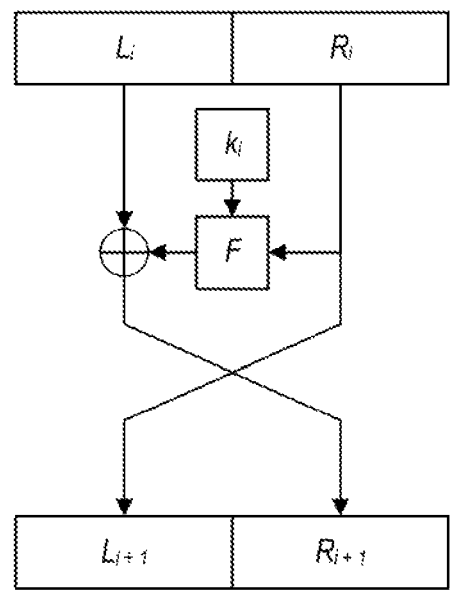
FIG. 6 illustrates one round of a Feistel network, in accordance with various example implementations.

FIG. 6 illustrates one round of a Feistel network in accordance with example implementations of the present disclosure. As shown, a block of data may be divided into the initial left half ($L_0$) and initial right half ($R_0$). The updated left half ($L_{i+1}$) and updated right half ($R_{i+1}$) may be calculated for each round i=0, 1, . . . , n:

$$L_{i+1} = R_i$$

$$R_{i+1} = L_i \oplus F(R_i, k_i)$$

In the preceding, F represents a round function, and $k_i$ represents the round key. Also, $\oplus$ represents a mixing operation, which in some examples may be an arithmetic (truncated) addition or bitwise logical XOR operation. The output at round n, then, may be updated block of data ($L_{n+1}$, $R_{n+1}$).

Figure 7:
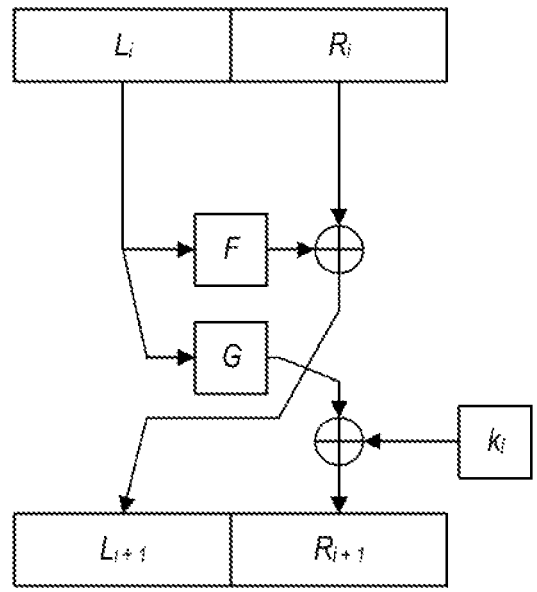
FIGS. 7 and 8 illustrate one round of a double-mix Feistel network (DMFN), in accordance with various example implementations.

FIG. 7 illustrates one round of a DMFN in accordance with example implementations of the present disclosure. As shown, similar to the Feistel network, a block of data may be divided into the initial left half ($L_0$) and initial right half ($R_0$). For the DMFN, the updated left half ($L_{i+1}$) and updated right half ($R_{i+1}$) may be calculated for each round i=0, 1, . . . , n:

$$L_{i+1} = F(L_i) \oplus R_i$$

$$R_{i+1} = G(L_i) \oplus k_i$$

In the preceding, F and G represent first and second round functions, and $k_i$ represents the round key. And similar to before, the output at round n may be updated block of data ($L_{n+1}$, $R_{n+1}$).

In the case of the Feistel network and/or DMFN of example implementations, the round function (F) may be a nonlinear function. The function may or may not be invertible, although the inverse should (but need not) be hard to compute (one-way function) in instances in which the first function is invertible. The security of the scheme may rely on the secrecy of the round key $k_i$, and on the requirements on F, that it is nonlinear and either has no inverse or has one that is hard to compute. The function may in some examples depend on the round (e.g., $F_i$), although in other examples, the first function may be independent of the round.

One example of a suitable round function (F) includes a plurality of logical NAND operations each of which is for a respective pair of shifted versions of the input left half, and a logical XOR for the respective outputs of the NAND operations. In the context of three NAND operations, the first function may include the following:

a first NAND operation for a first pair of shifted versions of $L_i$,
  a second NAND operation for a second pair of shifted versions of $L_i$;
  a third NAND operation for a third pair of shifted versions of $L_i$; and
  a XOR operation for the respective outputs of the first, second and third NAND operations.

In hardware implementations, these shifts or rotations may not consume time as they may be simply implemented with wirings. Thus, the first function may only require the time of two XOR gate delays, plus the delays of the two input NAND gates (although AND or NOR gates work equally well), which with optimized cell libraries, may be the time equivalent of four NAND2 gate delays.

In the case of the DMFN, the second round function (G) may be invertible, although its inverse need not be easily computable. Similar to the first function (F), the second function may in some examples depend on the round (e.g., $G_i$), although in other examples, the second function may be independent of the round.

In some examples, a layer of substitution boxes (s-boxes) may be used for the second function (G), which may make its mapping nonlinear. In other examples, the second function may perform a circular shift or rotation of the left half, which may then be mixed with the round key to calculate the updated right half. In a more particular example, the second function may produce a circular-shifted version of the left half, each three bits of which may be XOR-ed with a bit of the round key to produce a bit of the resulting, updated right half. In this regard, it may be shown that at block lengths=$2^n$, XORing any three circular shifted versions of the data defines an invertible function. Similar to the first function, in hardware implementations, these shifts or rotations may not consume time as they may be simply implemented with appropriate wirings. Thus, the second function and mixing operations may only require the time of two XOR gate delays, which with optimized cell libraries, may be the time equivalent of 1.5 to 3 NAND2 gate delays.

Figure 8:
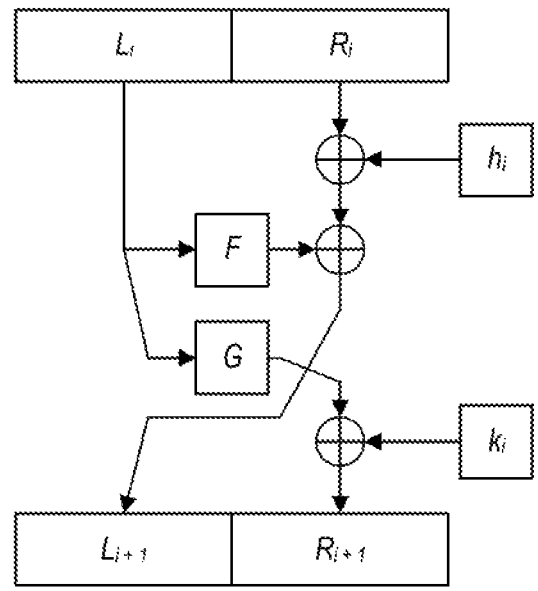

Reference is now made to FIG. 8, which illustrates one round of a DMFN in accordance with these other example implementations. In the DMFN, by applying the round key $k_i$ to alter $R_{i+1}$ instead of $L_{i+1}$, the work calculating the two halves may be balanced. That is, the two halves may become available in the same time. But $R_i$ may be unused while the first function (F) is applied. Thus, as shown in FIG. 8, $R_i$ may be mixed with another round key $h_i$ without upsetting the balance. And both $R_{i+1}$ and $L_{i+1}$ may be influenced by key material. The DMFN shown in FIG. 8 may achieve better overall mixing properties when functions of similar complexity are chosen for the first function (F) and second function (G). In yet other examples such as in instances in which the second function is slower to calculate than the first function, the mixing in of $k_i$ may be omitted, which may result in a scheme similar to the DMFN shown in FIG. 7 in mixing properties, but slightly faster.

Figure 9:
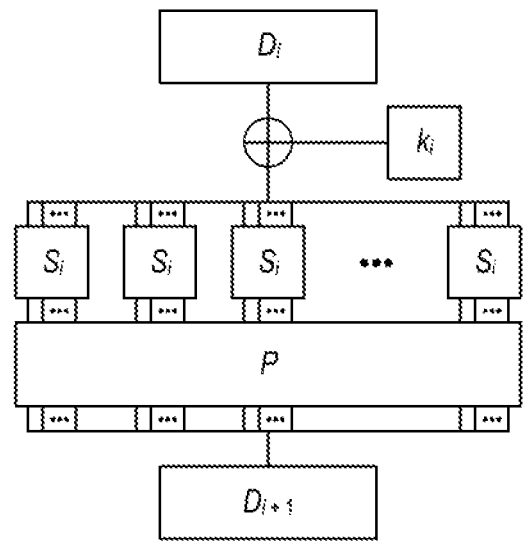
FIGS. 9 and 10 illustrate one round of a substitution-permutation network, in accordance with various example implementations.

Similar to the Feistel network and DMFN, the substitution-permutation network of example implementations may be performed in iterations (or rounds). FIG. 9 illustrates one round of a substitution-permutation network in accordance with example implementations of the present disclosure. As shown for a round (i), an input block of data ($D_i$) may be mixed (e.g., XOR-ed) with a round key ($k_i$), and the result may be mixed through a substation layer including a plurality of s-boxes ($S_i$), and a linear transformation layer including a permutation (P), to produce an updated block of data ($D_{i+1}$). In another example, the input block of data may be first mixed through the substitution and linear transformation layers to produce the updated block of data, which may then be mixed with the round key ($k_i$). In either example, either or both of the s-boxes and permutation may depend on or be independent of the round. And in some examples, at least two of the s-boxes for at least one of the rounds may be different. In the example of FIG. 5, the s-boxes are shown as depending on the round (e.g., $S_i$), while the permutation is shown as being independent of the round.

Figure 10:
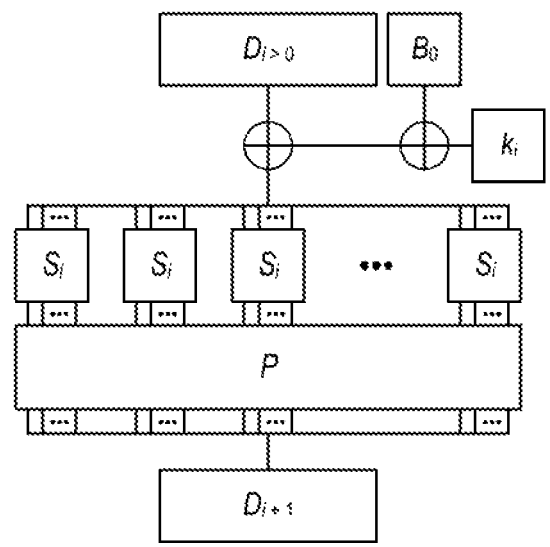

FIG. 10 illustrates one round of a substitution-permutation network in accordance with other example implementations, at least for rounds after the first round (i>0). The substitution-permutation network of FIG. 10 may be similar to that of FIG. 9 except that the initial block of data ($D_0$) may be only a subset of a larger block of data that also includes at least one other subset ($B_0$). In FIG. 10, the round key ($k_i$) may be mixed (e.g., XOR-ed) with the other subset ($B_0$) to produce a mixed round key, and it may be mixed with the input block of data ($D_i$) for the round. Or in another example, the round key may be mixed with the other subset, and the resulting mixed round key may be mixed with the updated block of data ($D_{i+1}$) after the substitution and linear transformation layers.

Figure 11:
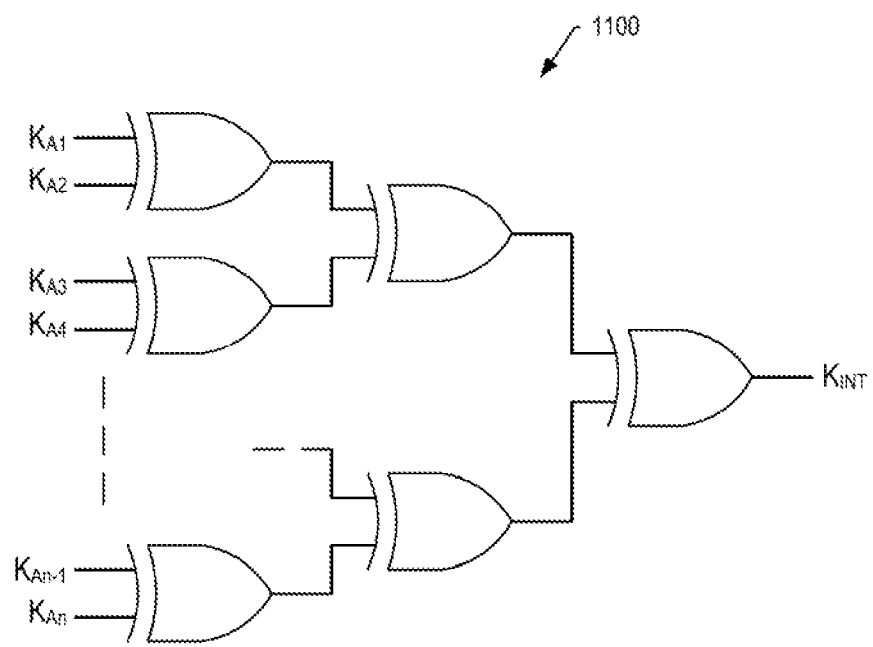
FIG. 11 illustrates a binary tree of exclusive-or (XOR) operations, in accordance with various example implementations.

FIG. 11 illustrates an XOR tree 1100 in accordance with various example implementations. In accordance with examples using an XOR tree, the mixing function may be based on secret random numbers (e.g., KMS 324) and the input block of data. In this regard, the sub-keys may be blocks of secret random numbers in a sequence of blocks at positions corresponding to those of certain bits in the input block of data, such as those bits having a binary value of one (or alternatively zero). The sub-keys may then be mixed together using an XOR tree. In some examples, the input block of data may correspond or relate to memory location address and perhaps other data, such as version value, configuration data or the like. In a 32-bit address space for blocks of data (128 GB physical RAM with 16 byte blocks of data being accessed together), a depth 5 XOR tree may be sufficient for mixing the sub-keys, which together may cause some 12 . . . 15 gate delays, far less than a single clock cycle.

More notationally, the mixing function of these examples may include producing a plurality of sub-keys ($K_{A1}$, $K_{A2}$, . . . , $K_{An-1}$, $K_{An}$), which may be blocks in a sequence at positions corresponding to certain bits (A1, A2, . . . , An-1, An) in an input block of data. The sub-keys may be mixed together using an XOR tree to produce an updated block of data ($K_{INT}$), such as in accordance with the following ($\oplus$ denoting an XOR operation):

$$K_{INT} = K_{A1} \oplus K_{A2} \oplus \ldots K_{An-1} \oplus K_{An}$$

As shown in FIG. 11, the XOR tree 1100 may include a plurality of XOR logic gates that may be implemented to carry out the mixing operation. In FIG. 11, each of the logic gates represents a series of gates, one for each bit of the values on which they operate.

Further information regarding various features of the DMFN according to example implementations may be found below and in the aforementioned, related and incorporated '978 application. Further information regarding various features of the substitution-permutation network according to example implementations may be found in the aforementioned, related and incorporated '042 application. And further information regarding various features of the XOR according to example implementations may be found in the aforementioned, related and incorporated '006 application Returning to FIG. 5 and with further reference to FIGS. 6-11, as also explained above, the parallel mixing functions of example implementations may be different from one another. In some examples, mixing functions may be different combinations of Feistel networks, DMFNs, substitution-permutation networks, XOR trees and other types of mixing functions. In other examples, the structure of a particular type of mixing function may differ from mixing function to mixing function. For example, multiple mixing functions may be implemented by respective Feistel networks including respective, different round functions (F); DMFNs including respective, different first round functions (F) or second round functions (G); or substitution-permutation networks including respective, different substitution layers (s-boxes, $S_i$) or transformation layers (permutation, P). In the case of XOR trees, for example, different bits of the input block of data may be used to select different sub-keys to be mixed using respective XOR trees.

In the case of substitution-permutation networks, they may be constructed to include a sufficient number of rounds so that every bit of the input block of data influences every bit of the updated block of data. In some examples, though the networks may be constructed with 1 . . . 4 additional rounds to account for certain data and key combinations that may result in regularities that may otherwise be exploited by an attacker. In relation to the number of bits of the n-bit input block of data and size of the s-boxes of the substitution layer, the substitution-permutation networks may be constructed for the following numbers of rounds:

| S-Box Size | 3 × 3 | 4 × 4 | 8 × 8 |
| --- | --- | --- | --- |
| n = 64 | 4 | 3 | 2 |
| n = 128 | 5 | 4 | 3 |
| n = 256 | 6 | 4 | 3 |

Returning now to FIGS. 2 and 3, at write operation at a memory location in the window of memory locations in the memory 204 according to example implementations may include the microprocessor core 202 generating a request for data at a memory location having a respective address, and providing that address to the memory 204 on the first bus 208. Of course, rather than receiving the address from the microprocessor core, the address may be provided from some other requestor such as a direct memory access (DMA) controller.

The received address may also be provided to the SMTU 206. In some examples, the address may be a logical address, and may be translated by the address translation unit 314 to a physical address. The address may be provided through the transaction control unit 312 to the key generator 318, which may functionally include three key generators, at times referred to herein as key generators W, C and D configured to generate respective keys W, C and D. Each of the three key generators may also receive the random numbers earlier stored or generated in the KMS 324. Stored at the memory location is the write counter value (e.g., data version value), data authentication tag and block of ciphertext, and this information may be provided to the transaction control unit. In some examples, the write counter value may be encrypted, and this encryption can be very simple, and its key can be a predefined constant, without significant loss of security.

The encryption unit 320 or another component of the SMTU 206 may decrypt the write counter value using key W. The encryption unit may decrypt the ciphertext using key C, while the transaction control unit may employ the data-hashing unit 322 to verify the integrity of the ciphertext based on the ciphertext, key D and data authentication tag, and in some examples. Assuming that the integrity of the ciphertext is verified, the decrypted ciphertext (now plaintext) may be rewritten to the memory location. On the other hand, instances in which the ciphertext authenticity is not verified may signal an error.

In instances in which an error occurs, it may indicate that a random error or possible data tampering has occurred, and the transaction control unit 312 may perform any of a number of different actions in response. For example, the transaction control unit may cause the system 200 to (i) stop processing all read and write requests, (ii) delete the random number used for encryption in the current session, (iii) flush all registers that participated in key generation activities, (iv) trigger a memory flush to overwrite the content of the memory window with all zeros, or (v) take other action. In another example, the transaction control unit may maintain a fault counter, which may be incremented in response to an error. In this approach, if a threshold of the number of errors is reached, the transaction control unit may cause any one or more of the aforementioned actions. This approach may be useful in a noisy environment where random memory read errors occasionally occur.

In some examples, a write operation at a memory location in the memory 204 may be preceded by a read operation at the memory location, such as that described above, to verify that the data stored at the memory address is authentic. If prior read is performed, only if the read operation establishes the authenticity of the data, does a write operation occur. In some examples, then, the write operation may include the transaction control unit 312 being configured to merge new data to be written with the decrypted ciphertext (plaintext).

The transaction control unit 312 being configured to increment a GWC, and provide the updated value to each of key generators C and D of key generator 318. Using the incremented write counter value and the address of the memory location, key generators C and D may generate new keys C and D, and provide the keys to the encryption unit 320 and data-hashing unit 322, respectively. The encryption unit may use new key C to encrypt the merged plaintext to produce new ciphertext, and the data-hashing unit may use the reproduced ciphertext and key D to produce a new data authentication tag. The combination of key W and the incremented GWC value may be used to provide an encrypted write counter value. The resulting write counter value, data authentication tag and ciphertext may then be returned and written to the memory location.

Figure 12:
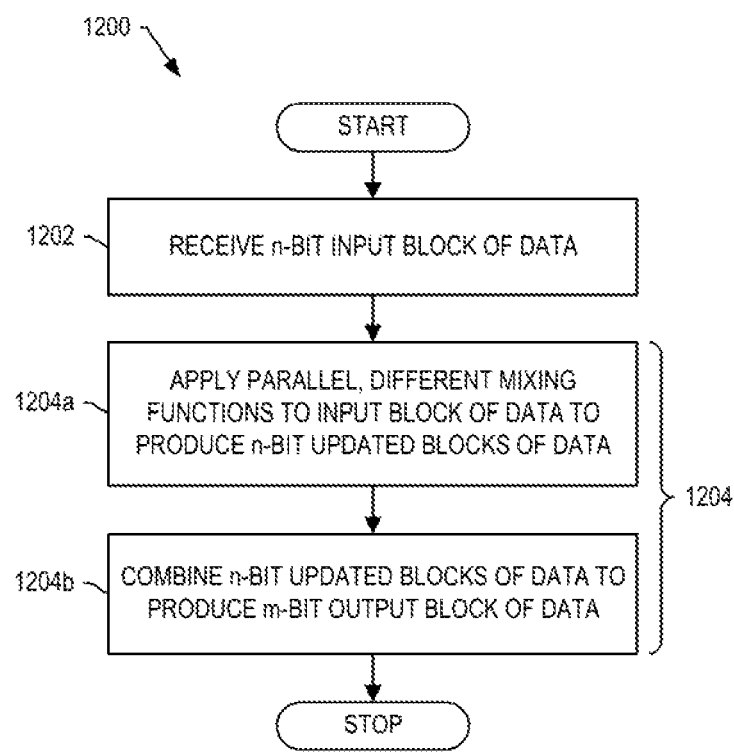
FIG. 12 illustrates a flowchart including various operations in a method according to example implementations.

FIG. 12 illustrates various operations in a method 1200 of providing security in a computer system, according to example implementations of the present disclosure. As shown at block 1202 and at 1204, the method may include receiving an n-bit input block of data, and producing an m-bit output block of data from the n-bit input block of data, the production of which may be performed by one or more logic circuits in at most one clock cycle thereof. The m-bit output block of data may be produced by a cipher that is non-invertible, and includes a plurality of parallel, different mixing functions and a combination function. As shown at block 1204a, producing the m-bit output block of data includes applying the plurality of parallel, different mixing functions to the n-bit input block of data to produce a plurality of n-bit updated blocks of data, with each mixing function mapping the n-bit input block of data to a respective one of the plurality of n-bit updated blocks of data. And as shown at block 1204b, producing the m-bit output block of data includes combining the plurality of n-bit updated blocks of data in the combination function to produce the m-bit output block of data.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for providing security in a computer system, the system comprising one or more logic circuits configured to at least:

apply a plurality of parallel, different mixing functions to an n-bit input block of data to produce a plurality of n-bit updated blocks of data, each mixing function being configured to map the n-bit input block of data to a respective one of the plurality of n-bit updated blocks of data; and combine the plurality of n-bit updated blocks of data in a combination function to produce an m-bit output block of data.

2. The system of claim 1, wherein the plurality of parallel, different mixing functions are invertible.

3. The system of claim 1, wherein at least some mixing functions of the plurality of parallel, different mixing functions are implemented by respective Feistel networks including respective, different round functions.

4. The system of claim 1, wherein at least some mixing functions of the plurality of parallel, different mixing functions are implemented by respective double-mix Feistel networks including respective, different first or second round functions.

5. The system of claim 1, wherein at least some mixing functions of the plurality of parallel, different mixing functions are implemented by respective substitution-permutation networks including respective, different substitution layers or transformation layers.

6. The system of claim 1, wherein at least some mixing functions of the plurality of parallel, different mixing functions are implemented by respective binary trees of exclusive-or (XOR) operations, in which a plurality of sub-keys are produced from the input block of data and mixed using the respective binary trees.

7. The system of claim 1, wherein in the combination function, each bit of the m-bit output block of data depends from one or more bits of the n-bit input block of data, and every bit of the n-bit block of data influences one or more bits of the m-bit output block of data.

8. The system of claim 7, wherein the combination function is implemented by a bitwise exclusive-or (XOR) operation.

9. The system of claim 1, wherein m in the m-bit output block of data is different in number than n in the n-bit input block of data.

10. The system of claim 1, wherein the m-bit output block of data is a data authentication tag that depends on a respective address of a memory location in a memory,
wherein the one or more logic circuits are further configured to perform a write operation to write a block of ciphertext and the data authentication tag at the memory location having the respective address, and
wherein the memory includes a window of memory locations each of which stores a respective data authentication tag that changes from memory location to memory location.

11. The system of claim 1, wherein the m-bit output block of data is a multi-bit pad value that is based on a respective address of a memory location in a memory,
wherein the one or more logic circuits are further configured to combine the pad value with a block of plaintext by an exclusive-or (XOR) operation to produce a block of ciphertext, and perform a write operation to write the block of ciphertext at the memory location having the respective address, and
wherein the memory includes a window of memory locations each of which stores a respective block of ciphertext that changes from memory location to memory location.

12. A method of providing security in a computer system, the method comprising:
applying a plurality of parallel, different mixing functions to an n-bit input block of data to produce a plurality of n-bit updated blocks of data, each mixing function mapping the n-bit input block of data to a respective one of the plurality of n-bit updated blocks of data; and
combining the plurality of n-bit updated blocks of data in a combination function to produce an m-bit output block of data.

13. The method of claim 12, wherein the plurality of parallel, different mixing functions are invertible.

14. The method of claim 12, wherein at least some mixing functions of the plurality of parallel, different mixing functions are implemented by respective Feistel networks including respective, different round functions.

15. The method of claim 12, wherein at least some mixing functions of the plurality of parallel, different mixing functions are implemented by respective double-mix Feistel networks including respective, different first or second round functions.

16. The method of claim 12, wherein at least some mixing functions of the plurality of parallel, different mixing functions are implemented by respective substitution-permutation networks including respective, different substitution layers or transformation layers.

17. The method of claim 12, wherein at least some mixing functions of the plurality of parallel, different mixing functions are implemented by respective binary trees of exclusive-or (XOR) operations, in which a plurality of sub-keys are produced from the input block of data and mixed using the respective binary trees.

18. The method of claim 12, wherein in the combination function, each bit of the m-bit output block of data depends from one or more bits of the n-bit input block of data, and every bit of the n-bit block of data influences one or more bits of the m-bit output block of data.

19. The method of claim 18, wherein the combination function is implemented by a bitwise exclusive-or (XOR) operation.

20. The method of claim 12, wherein m in the m-bit output block of data is different in number than n in the n-bit input block of data.

21. The method of claim 12, wherein the m-bit output block of data is a data authentication tag that depends on a respective address of a memory location in a memory,
wherein the method further comprises performing a write operation to write a block of ciphertext and the data authentication tag at the memory location having the respective address, and
wherein the memory includes a window of memory locations each of which stores a respective data authentication tag that changes from memory location to memory location.

22. The method of claim 12, wherein the m-bit output block of data is a multi-bit pad value that is based on a respective address of a memory location in a memory,
wherein the method further comprises combining the pad value with a block of plaintext by an exclusive-or (XOR) operation to produce a block of ciphertext, and performing a write operation to write the block of ciphertext at the memory location having the respective address, and
wherein the memory includes a window of memory locations each of which stores a respective block of ciphertext that changes from memory location to memory location.

* * * * *